Patented Mar. 4, 1930

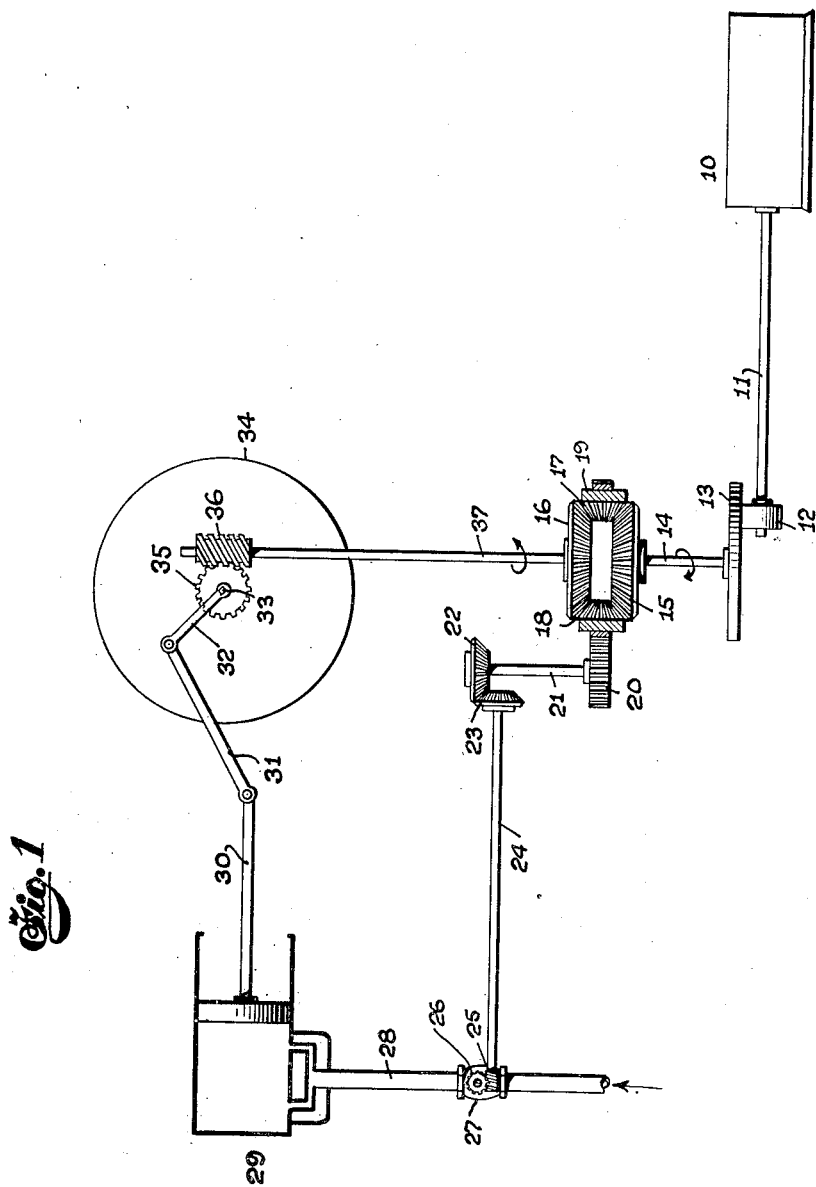

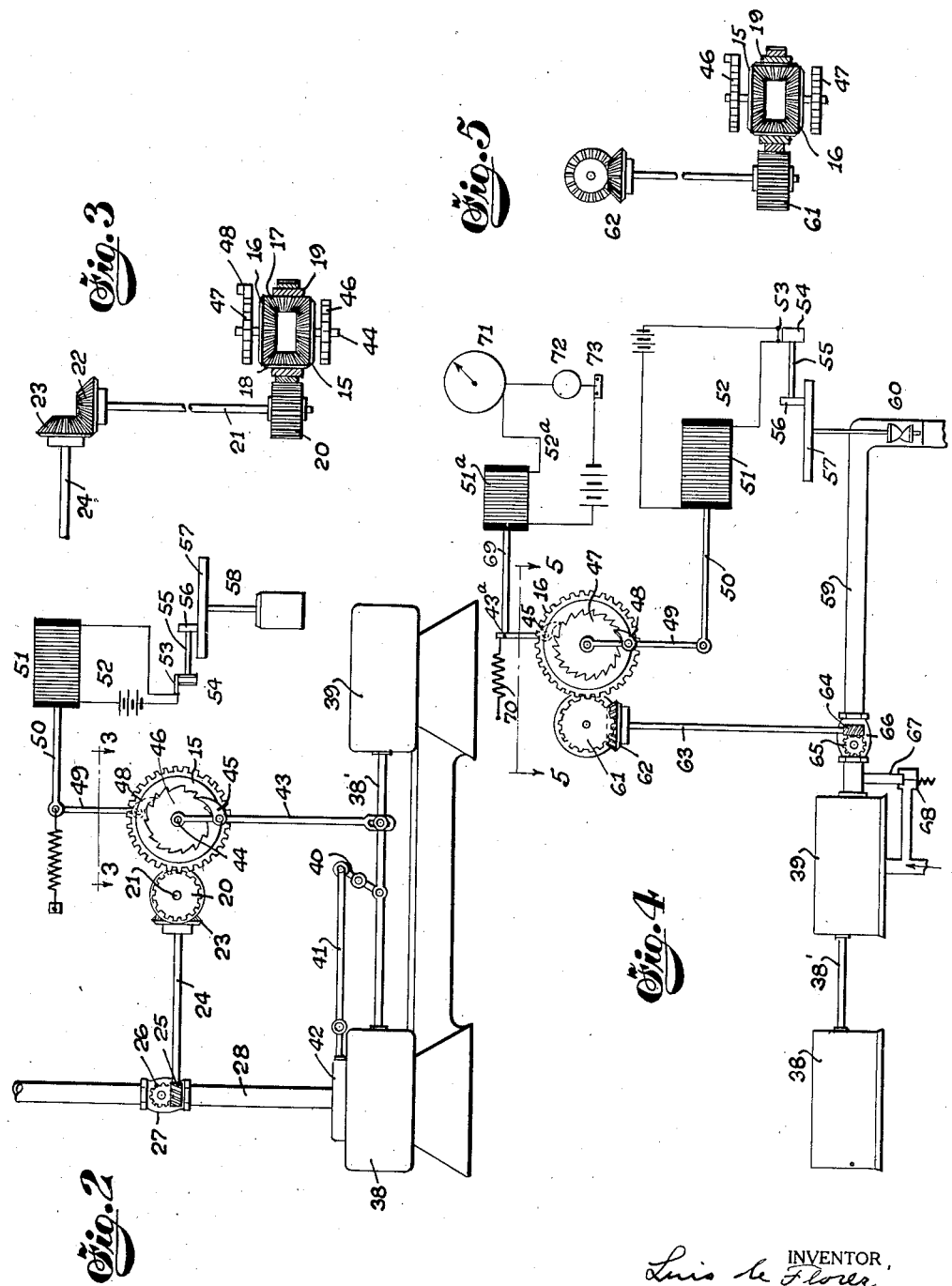

1,749,569

UNITED STATES PATENT OFFICE

LUIS DE FLOREZ, OF POMFRET, CONNECTICUT

SPEED REGULATOR AND METHOD OF SPEED REGULATION

Application filed July 3, 1924. Serial No. 724,017.

My invention relates to an improved means and method of controlling speed, and the theory involved is that of matching, for instance mechanically, the speed of a prime mover which may for example be a steam engine or the like, with an independently controlled speed standard, and correcting the conditions to speed up or slow down the mechanism to be regulated in accordance with its variation in speed from the standard. This principle it will be seen is susceptible of a number of applications; for instance, governing the rate of speed of, or the rate of flow from a pump.

In the case of a prime mover such as a steam engine, the throttle may be controlled by a member which responds both to the rate of movement of the steam engine piston or the rotation of its shaft, and to the speed of a speed standard which may be constant or variable, according to the character of regulation desired. A differential gear mechanism such as that described in detail hereafter may be employed to impart a control from both sources of motion to the throttle control member. The control obtained is thus the related result of the speed or speeds of the prime mover and the speed standard.

If the problem involved is controlling the speed, which is the rate of piston displacement in the case of a pump, a link mechanism may be connected to the piston rod of that pump to actuate a differential gear mechanism, one member of which is actuated in the opposite direction by a time mechanism so that it rotates at a standard speed. The two driven parts of the differential may be mechanically connected by bevel pinions suitably held in place and forming a part of the differential. It will be readily seen that if the speeds of the two bevel gears of the differential in opposite directions are identical, the connecting ring gear will not change its position, but if they vary from each other, the connecting ring gear will rotate in the direction of that member of the differential which turns the faster. The ring gear of the differential may be connected through a suitable train to the throttle valve of the pump, and thus as the pump speed varies from the standard, the throttle valve setting will be modified to correct the variation.

It will be noted that by having a definite mechanical connection between the piston rod of the pump and one member of the differential, the movement of the differential member will be proportioned to the travel of the pump piston, and that in matching this movement against the time operating mechanism, a correction can be made over a given amount of lineal travel per minute, and a correct regulation obtained regardless of the occasional short stroking of the pump.

This example refers to a pump and a flow of liquid actuated by the pump, but illustrates the theory of the invention, and from the description which follows it will be clear that the invention has other and very wide applications.

Figure 1 is a diagrammatic view illustrating the general principle of the invention and showing the application to a prime mover and a motor which serves as a standard or source of constant speed.

Figure 2 is a diagrammatic elevation showing the application of the invention to a steam pump which is controlled from a motor as in Figure 1, but in which a solenoid controlled from the motor is connected to one member of the differential, while a second member is connected to a piston.

Figure 3 is a sectional plan on the line 3—3 of Figure 2.

Figure 4 shows the specific application of the invention to a pipe line, which might be an oil pipe line and in which the mechanism the speed of which is to be controlled is the meter of the oil delivery pipe, and Figure 5 is a sectional plan on the line 5—5 of Figure 4.

The invention which will appear from the description which follows, has many applications, and the drawings therefor are by way of example with the idea of illustrating the principle of the invention rather than to show any specific novel construction, although the organization and arrangement of the structure is believed to be new.

In Figure 1 the general application of the invention to a prime mover is illustrated in a diagrammatic way. In this view the motor 10 has its shaft 11 connected by a friction wheel 12 with a friction disc 13 on a shaft 14, thus connecting the speed standard with one member 15 of the differential, which is a conventional differential gear having an opposed member 16 opposite the member 15 connected to the prime mover, both bevel gears 15 and 16 connecting with bevel pinions 17 and 18 attached to the ring gear 19. This connects with a gear 20 on the shaft 21, and this in turn connects by bevel gears 22 and 23 with a shaft 24 connecting in turn through gears 25 and 26 with the throttle valve 27 of the supply pipe 28, conveying the driving fluid to the prime mover 29, which may be a steam engine. The piston rod 30 of the engine connects by a link 31 with the crank 32 of the shafts 33, which has a flywheel 34, and connects by a worm gear 35—36 with the shaft 37 of the second member 16 of the differential.

In the illustration referred to, we will assume that the standard or constant speed is represented by the disc 13 driven by motor 10. If now the shaft 14 of the constant or standard of speed turns faster than the shaft 37, motion will be transmitted from the shaft 14 through the differential and the gear train described to open the throttle 27, thus admitting more pressure fluid to the engine 29, which will therefore speed up through the connected gearing the shaft 37 until the member 16 of the differential turns at the same speed as the member 15, in which case the speed of the prime mover will be that of the standard 13; and as long as the speeds of the shafts 37 and 14 are equal, the ring gear 19 will not move and the valve 27 will therefore remain at the point in which it may be set. If, however, the speed of the shaft 37 is faster than that of the shaft 14, it will operate through the differential and connected gearing to slightly close the throttle 27, thus bringing about the desired equilibrium and maintaining a substantially constant speed of the prime mover 29, and obviously of anything driven by it.

In Figure 2 the invention is shown slightly more in detail, and specifically applied to a reciprocating mechanism, such as a steam pump, and using a somewhat different method of applying the standard speed to effect correction. In this view is shown a conventional steam pump having a steam cylinder 38 and pump cylinder 39 connected by a common piston rod $38^1$, the latter having a link connection 40 with the slide rod 41 of the slide valve 42. In this example one member of the differential is moved by the reciprocating motion of the pump piston rod, and to this end a rod 43 is connected to the piston rod $38^1$ and pivoted on the shaft 44 of the member 15 of the differential. The rod 43 carries a pawl 45 which engages a ratchet wheel 46 fixed on the said stud or shaft 44. The opposite member 16 of the differential has a ratchet wheel 47 of opposite pitch which is moved by a pawl 48 on the oscillating rod 49, and this connects to a slide rod 50 actuated by the solenoid 51, the latter being arranged in the circuit 52. This circuit is opened and closed by any suitable or standard speed device, as for instance the brush 53 connecting with the commutator 54 on the shaft 55 which has a friction wheel 56 driven from a disc 57 and actuated by a motor 58, which as above referred to is the speed standard. The action in this instance is like that described with reference to Figure 1.

The standard of speed having its source in the disc 57 and motor 58 actuates the rod 50 by reason of the periodic variation of current in the solenoid through the commutator 54 and brush 53, and the in and out movement of this rod causes the oscillation of the rod 49 to actuate the ratchet wheel 47 and turn the member 16 of the differential in one direction, while the opposed ratchet wheel 46 tends to turn the member 15 in the opposite direction, and this as above indicated is actuated by the piston rod connection through the parts $38^1$ and 43. The ring gear 19 connects with the throttle valve 27 of the pipe 28 as already described, and it will be seen that the movement of the pump piston is matched with the movement of the solenoid rod 50, the latter having a connection with the standard speed, and so an excess of movement of either the member 15 or 16 with reference to the other, is compensated for in the manner already described, and a constant speed is maintained through the control of the steam pump.

In Figure 4 I have shown still another application of the invention to illustrate the fact that very many applications may be used, and the examples given will make this clear. As here illustrated, the steam pump forces a liquid through the delivery pipe 59 having a meter 60 which acts as a motor and turns the disc 57 which in this case has the connection between the disc and the solenoid 51 as already described with reference to the structure shown in Figure 2, but instead of controlling the throttle of the pump, the apparatus is adapted to control the flow through the pipe 59. Consequently the differential connects by the train of gearing 61—62 and the shaft 63 with the bevel gears 64 and 65 of the valve 66 in the pipe 59. As in this case a flow of liquid is controlled, there should be a by-pass pipe 67 connected with the pipe 59 between the valve 66 and the pump cylinder 39 to afford relief, and a relief valve 68 can be connected with it. It will be seen that the disc 57 through the parts controlled by the circuit 52, operates one side of the differential as already described, and in the case illustrated, the speed standard can be a clock 71 or other regularly moving part. This connects with the opposite or second side of the differential through mechanism influenced by the circuit 52ª. An oscillating rod 43ª can operate the pawl 45 as already described, and the rod is moved in one direction by the spring 70 and in the opposite direction by the arm 69 of the solenoid 51ª controlled by the clock 71 and mechanism 72, which may be any of the usual clock actuated devices for moving the switch 73 so as to open and close the circuit at regular intervals, for instance at every second, and thus the action of the device will be as already described. If the motor 60 is moving too slow with respect to the standard 71, the differential mechanism acts in the manner already set forth to open the valve 66 and permit a more rapid flow through the pipe 59, and contrariwise if the flow is too fast with respect to the speed standard, the latter through the circuit 52ª will move the differential so as to slightly close the valve 66 and choke the pipe.

It will be understood that by using proper proportions of the parts the prime mover speed may be fixed at any given ratio of the standard, and if the sole requirement of the problem is that two mechanisms shall operate at a given speed ratio, the absolute speed being immaterial, it will be seen that the speed of one mechanism may be made to regulate the other without recourse to a constant speed standard, and when I refer in this specification and the attached claims to a speed standard, I wish to include standards of relative as well as of absolute speed.

The foregoing example illustrates the fact that a great variety of apparatus may be used and many arrangements of mechanism made to carry the principle of my invention into effect, and to bring out clearly the idea that the invention is not limited to any particular mechanism, but involves the theory hereinabove set forth of matching mechanically the speed to be governed with an independently controlled and constant or standard speed, and constantly correcting conditions of speed changes in accordance with variation of these changes with respect to the said standard speed.

It will be noted that the elements 55, 56 and 57 constitute a conventional friction drive and in such drives the member 56 is usually adjustable radially with relation to the disc 57, so that by adjusting this member 56 the speed imparted to it by the member 57 may be varied. The result of this is that I get an adjustable speed standard by including this drive or one analogous to it in the connection between the speed standard and the speed to be controlled. I thus have a constant speed standard but one in which the constant speed may be adjusted to any desired rate, and while I have shown means for controlling the speed of a single mechanism, it will be seen that by having a plurality of members 56 running at different radial points on the disc 57 or analogous arrangement, I can control the speed of a plurality of devices from a single speed standard.

I claim:—

1. A speed regulator comprising a conduit adapted to carry a flow of fluid, means in said conduit for measuring the rate of flow of fluid therein, a speed standard, and means for regulating the rate of flow of fluid in response both to such rate of flow and to the rate of speed of the speed standard.

2. A method of regulating the discharge flow of a pump which comprises governing that flow in response to the differential in speed between a speed standard and the speed of the discharge flow.

3. A method of regulating the discharge flow of a pump which comprises translating the rate of flow into oscillatory movement, translating the motion of a speed standard into oscillatory movement and varying the rate of flow according to the differential between the two oscillatory movements.

4. Apparatus for effecting a uniform rate of fluid flow comprising a member rotating at a speed dependent upon the rate of flow of said fluid, a second member rotating at a speed independent of the rate of flow of said fluid and representative of said uniform rate of flow, and, means for changing the rate of flow of the fluid in response to the relation to each other of the angular velocities of said members.

5. The method of controlling the rate of flow of a continuous stream of fluid, which consists in rotating a member by said fluid at a rate proportionate to its rate of flow, independently rotating another member at a predetermined speed and changing the rate of flow of the fluid to extents dependent upon the extents of variations in the difference between the angular velocities of said members.

6. A flow regulator comprising a fluid motor, a fluid conduit connected to the discharge thereof, a speed standard, and means for varying the speed of the motor in response to the differential between the rate of flow in said conduit and the speed of the standard.

7. A flow regulator comprising a conduit, a fluid motor, the speed of which is responsive to the rate of flow in said conduit, a speed standard, and means for varying the rate of flow in said conduit proportionately to the difference in speed between the speed of the motor and that of the speed standard.

8. A flow regulator comprising a conduit, a fluid motor, the speed of the motor and the rate of flow in the conduit being directly proportional to one another, a prime mover, and means for regulating the speed of the motor in response to the differences between the rate of flow in the conduit and the speed of the prime mover.

9. A flow regulator comprising a fluid motor in which the rate of flow of input and output is substantially the same, a speed standard, and means for regulating the speed of said motor in response to the differential between the speed of said standard and said rate of flow.

10. The method of regulating a hydraulic motor which comprises regulating the speed of the motor in response to the differential between the speed of a standard and the rate of flow of liquid through the motor.

11. In combination, a pipe through which there is a flow of fluid, a meter in said pipe having a member rotating at a speed proportional to the rate of fluid flow through said meter, a valve controlling the rate of fluid flow through said pipe, a speed standard rotating at a predetermined speed, and means for controlling said valve in accordance with the difference between the movements of said rotating member and said speed standard.

12. In combination, a pipe through which there is a flow of fluid, a meter in said pipe having a member rotating at a speed proportional to the rate of fluid flow through said meter, a valve controlling the rate of fluid flow through said pipe, a speed standard rotating at a predetermined speed, a differential gear, means operated by said rotating member of said differential gear, means operated by said speed standard for producing proportional movement of another member of said differential gear, and means operated by said differential gear for controlling the valve in accordance with the differential of the movements of said members of the gear.

13. Apparatus for regulating the rate of fluid flow comprising a conduit for said fluid, a valve in said conduit, and means for controlling said valve in accordance with the rate of flow of said fluid including a differential gear having independently moved members, a speed standard for actuating one of said members of said differential gear, and means including a meter responsive to the rate of flow of said fluid for actuating another of said members of said differential gear.

14. Apparatus for regulating the rate of fluid flow comprising a conduit for said fluid, a valve in said conduit, and control means for said valve including a differential mechanism having independently moved members changing the relative positions with respect to each other irrespective of the presence of regulatory motion, a speed standard for actuating one of the members of said differential mechanism, and means including a meter responsive to the rate of flow of said fluid for actuating another of the members of said differential mechanism.

In testimony whereof, I have signed my name to this specification this 1st day of July, 1924.

LUIS DE FLOREZ.